United States Patent [19]

Bluband

[11] Patent Number: 4,912,615
[45] Date of Patent: Mar. 27, 1990

[54] DEVICE FOR FEEDING FIBER OR CABLE THROUGH A HOUSING

[75] Inventor: Zakhary Bluband, Plymouth, Minn.

[73] Assignee: ADC Telecommunications, Inc., Minneapolis, Minn.

[21] Appl. No.: 208,161

[22] Filed: Jun. 17, 1988

[51] Int. Cl.$^4$ ............................................. H05K 13/00
[52] U.S. Cl. ...................................................... 361/428
[58] Field of Search ........................ 361/428, 394, 391; 312/223; 254/134.3 R

[56] References Cited

U.S. PATENT DOCUMENTS

| | | | |
|---|---|---|---|
| 3,710,199 | 1/1973 | Cignoni, Jr. | 361/391 |
| 4,353,518 | 10/1982 | Taylor et al. | 312/223 |
| 4,686,608 | 8/1987 | Hosking | 361/428 |

Primary Examiner—Roy N. Envall, Jr.
Attorney, Agent, or Firm—Merchant, Gould, Smith, Edell, Welter & Schmidt

[57] ABSTRACT

A device for transporting fiber, wires or cables from the rear of a chassis to the front includes an armature member mounted to pivot in a plane parallel to the top of the housing. The armature is pivotable between a first position in which a first end is proximate an aperture in the rear of the housing and a second position in which the end of said first arm proximate the front of the chassis. A second arm is provided to actuate the armature, with the second arm being accessible from the front of said chassis when said armature is in the first position. A signal carrying medium may thus be connected to the end of first arm and readily transported through to the front of the chassis.

5 Claims, 1 Drawing Sheet

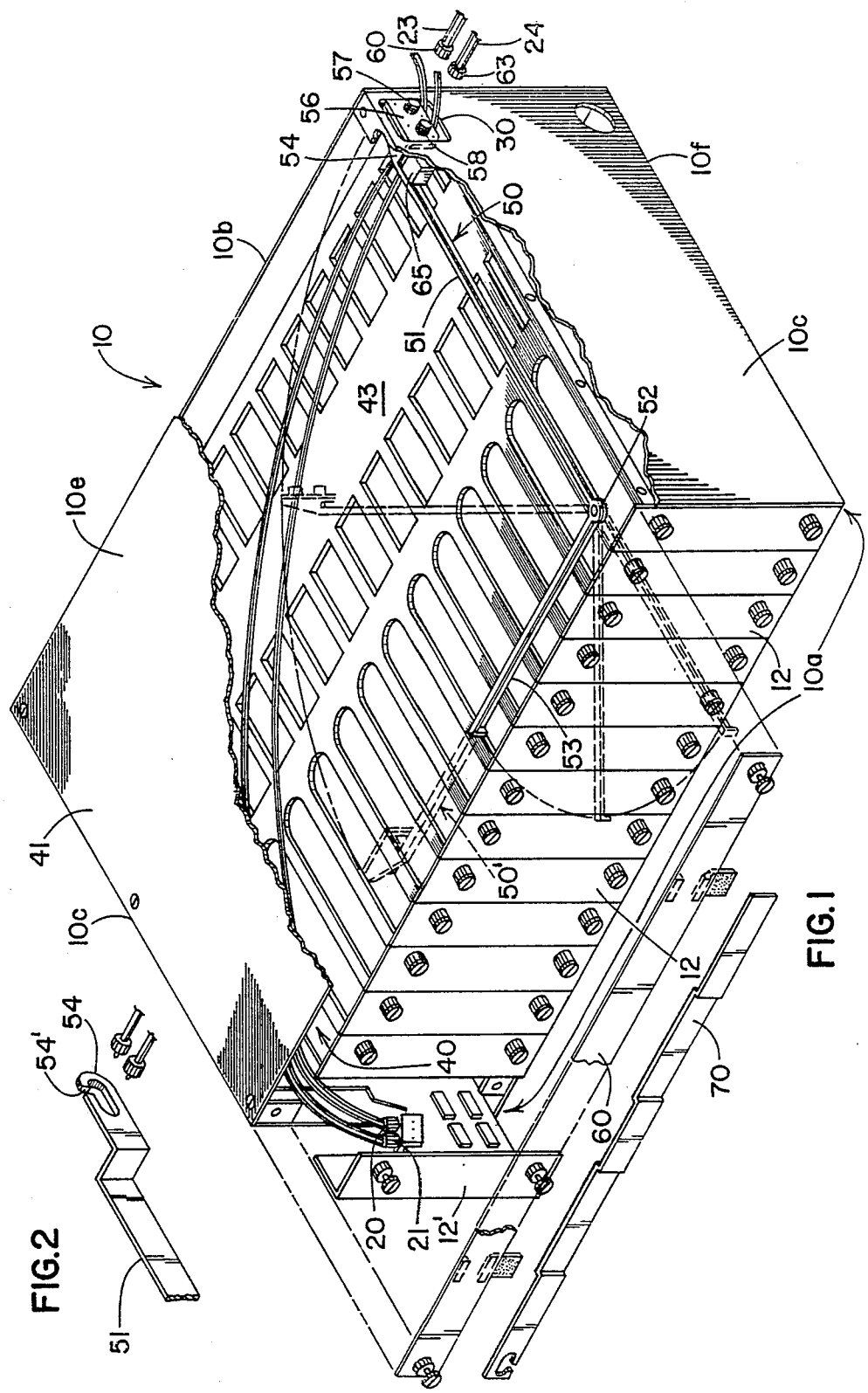

DEVICE FOR FEEDING FIBER OR CABLE THROUGH A HOUSING

TECHNICAL FIELD OF THE INVENTION

The present invention relates generally to the telecommunications field, and more particularly to telecommunications equipment wherein wire fibers or cables are fed into a chassis for connection to cross-connection circuits or other signal processing circuits contained therein.

BACKGROUND OF THE INVENTION

Much telecommunications equipment is sold in the form of a chassis containing telecommunications electronics to be connected into a wire, cable or fiber network. Such chassis are typically mounted in racks, stacked one on top of the other, and wires, cables or fibers from a network are fed into the rear of the chassis and connected to the telecommunication circuitry contained therein. The circuitry may comprise, for example, line monitoring and patching circuitry, relay circuitry, cross-connection circuitry or signal conversion circuitry.

In equipment of the above described type it is often necessary to transport the signal carrying medium, i.e. wire, cable or fiber, from the rear of the chassis to the front of the chassis so that it can be attached to the equipment inside. The present invention provides a simple and effective device for performing this function.

SUMMARY OF THE INVENTION

The present invention provides a device for transporting cable from the rear to the front of a chassis. According to one aspect of the invention, there is provided a chassis having a front and rear end, with the rear end including an aperture through which a signal carrying medium such as fiber, cable or wire can be inserted. Armature means is provided, and is pivotably mounted near the front corner of the chassis. The armature means includes a first arm for connecting to the signal carrying medium proximate said aperture, and a second arm which may be conveniently actuated from the front of said housing so that the armature means can be pivoted from a first position in which the end of said first arm is proximate said aperture to a second position in which the end of said first arm is proximate the front of said chassis. According to a further aspect of the invention, the end of said first arm includes means for coupling to said signal carrying medium.

BRIEF DESCRIPTION OF THE DRAWING

FIG. 1 is a cut-away perspective view of the device according to the present invention; and FIG. 2 is a partial-perspective of an alternative embodiment of the end of the armature according to the present invention.

DETAILED DESCRIPTION OF THE INVENTION

Shown in FIG. 1 is an implementation of the present invention in a telecommunications chassis 10. Chassis 10 has a front end 10a, a rear end 10b, sides 10c and 10c, a top 10e and a bottom 10f, chassis 10 contains telecommunications equipment in the form of a plurality of modules 12. In the illustrative implementation of the invention described herein, modules 12 comprise relay circuits for relaying fiber optic signals. Each of modules 12 are slidably mounted in chassis 10 and fastened in place in the chassis with a pair of captive screws inserted through the top and bottom of the front panel of each module. Thus, the modules may be unfastened from the front of the chassis and slid out, as shown with respect to module 12'. A horizontally oriented screw mounted panel cover 60 is provided to cover the space above modules 12 on the front end 10a of chassis 10.

As shown with respect to module 12', each of the modules 12 include first and second couplers 20 and 21 for connection to a pair of fiber optic cables 23 and 24. Cables 23 and 24 are fed through an aperture 30 in the rear of the chassis, whereby the fiber optic signals carried on one of the fibers can be amplified and relayed to the other through the circuitry contained in the modules 12.

Chassis 10 includes an open space 40 between the top cover 41 of chassis 10 and a card guide and mounting bracket 43 which is mounted inside chassis 10 spaced down from cover 41. The signal carrying medium, fiber cable in the specific example given herein, is fed through space 40 from the aperture 30 in the rear of the chassis to the connectors 20,21.

According to the present invention, there is provided an armature 50 which can be used to feed or fish the signal carrying medium from the aperture 30 in the rear of chassis 10 to the front of the chassis. Armature 50 is pivotably mounted in the corner 52 of housing 10, to rotate between a first position, shown in solid lines, to a second position shown in phantom lines (50'). Armature 50 includes a first arm 51 having an end 54 including a coupler 56 designed for coupling to the end of a signal carrying medium. In the example shown herein, the coupler 56 provides a pair of male couplers 57 and 58 which may be coupled to the female counterparts on the ends of a pair of fibers 60 and 63 to be transported through the chassis. Alternatively, as shown in FIG. 2, the end 54 of arm 51 could comprise a slotted design 54' in which the ends of cables to be transported could be inserted. Armature 50 further includes a second arm 53, at substantially a right angle to arm 51. Arm 53 provides a handle which can be grasped from the front of the chassis 10, to actuate the armature 50 to move it between its first and second positions. Of course, to operate armature 50, the front panel cover 60 must first be removed. A magnet 65 is mounted near aperture 30 to magnetically retain an armature 50 in its first position.

Preferably, space 40 between bracket 43 and top 41 of chassis 10 is made as large as possible to provide clearance between cables laying on top of bracket 43 and armature 50, so that it does not get caught as it is moved between its first and second positions. It has been found, however, that for implementation with fiber optic cables as in the example shown herein, a space of approximately one inch provides generally sufficient clearance. In the event, however, armature 50 gets snagged, there is provided a second transport device 70 which may be used to manually unsnag armature 50 and/or to fish signal carrying medium from the rear to the front of the chassis. Preferably, transport tool 70 is mounted with hook and loop fasteners on the back side of cover member 60, for convenient storage and access.

Those skilled in the art will readily recognize that many modifications and changes may be made to the invention without departing from the spirit and scope thereof. For example, aperture 30 need not be on the side rear of chassis 10, but could be in the rear panel of the chassis, or in the top or bottom rear panel of the chassis. Moreover, the end 54 of armature 50 could be readily modified to accommodate the alternative aperture positions. Furthermore, it is contemplated that the pivot point for armature 50 could be located in other positions and, relatedly, that arms 51 and 53 need not be at right angles to each other. Furthermore, it shall be understood that the present invention as described herein in a fiber optic embodiment by way of example only, and that the invention is equally applicable to implementation with other signal carrying media such as individual wires, ribbon cables, coaxial cables, etc. In addition, the invention is in no way limited to the design of modules 12 shown herein. Accordingly, it shall be understood that the scope of the present invention be determined in accordance with the claims appended hereto.

What is claimed is:

1. In a chassis containing telecommunications equipment for connection to signal carrying medium fed into said chassis through an aperture in the rear thereof, an armature member pivotably mounted in said chassis and including a first arm and a second arm, said armature pivotable between a first position in which the end of said first arm is proximate said aperture and said second arm is accessible from the front end of said chassis to a second position in which said end of said first arm is proximate the front end of said chassis, said armature being actuated by said second arm, whereby said first end may be connected to signal carrying medium at said aperture and transported through to the front end of said chassis.

2. The apparatus according to claim 1 wherein said end of said first arm includes a coupling means for mating with the end of the signal carrying medium to be fed into said housing whereby the signal carrying medium may be readily connected to said first end.

3. Apparatus according to claim 1 wherein said armature means is pivotably mounted in the top corner of said chassis so that said armature means pivots in a plane parallel to the top of said chassis.

4. Apparatus according to claim 1 wherein said signal carrying medium is a fiber for carrying fiber optic signals.

5. Apparatus according to claim 1 wherein said telecommunication circuitry comprises modules which may be slidably extracted from the front end of said chassis, and further wherein said modules include means for coupling to said signal carrying medium proximate the front end of said modules so that the signal carrying medium can be readily coupled to the module from the front of said chassis.

* * * * *